United States Patent [19]

Inaba et al.

[11] 4,200,890
[45] Apr. 29, 1980

[54] DIGITAL VIDEO EFFECTS SYSTEM EMPLOYING A CHROMA-KEY TRACKING TECHNIQUE

[75] Inventors: Masao Inaba; Kazuo Kashigi, both of Tokyo, Japan

[73] Assignee: Nippon Electric Company, Ltd., Tokyo, Japan

[21] Appl. No.: 922,634

[22] Filed: Jul. 7, 1978

[30] Foreign Application Priority Data

Jul. 11, 1977 [JP] Japan ................................ 52-83285
Jul. 11, 1977 [JP] Japan ................................ 52-83286

[51] Int. Cl.² ...................... H04N 5/22; H04N 9/535
[52] U.S. Cl. .................................... 358/183; 358/22
[58] Field of Search ...................... 358/22, 182, 183

[56] References Cited

U.S. PATENT DOCUMENTS

| | | | |
|---|---|---|---|
| 3,437,873 | 4/1969 | Eggert | 358/183 X |
| 3,654,386 | 4/1972 | Baum | 358/183 X |
| 3,787,619 | 1/1974 | Wolff | 358/183 |
| 4,028,727 | 6/1977 | Skrydstrup | 358/183 X |
| 4,063,280 | 12/1977 | Hattori et al. | 358/22 |
| 4,103,830 | 12/1978 | Derickson | 358/22 |

OTHER PUBLICATIONS

*The Digital Video Effects (DVE) System;* SMPTE Journal, Apr. 1978, vol. 87, pp. 214–218, Article by M. D. Patten.

Primary Examiner—John C. Martin
Assistant Examiner—Aristotelis M. Psitos
Attorney, Agent, or Firm—Hopgood, Calimafde, Kalil, Blaustein & Lieberman

[57] ABSTRACT

A chroma-key tracking system for electronically compressing a television picture to predetermined dimensions and for moving the compressed picture to a specified area on the television screen where the compressed picture is inserted into a second picture present on the screen. The chroma-key tracking system advantageously operates in the presence of electrical noise associated with the chroma-key tracking signal.

5 Claims, 16 Drawing Figures

DIGITAL VIDEO EFFECTS SYSTEM EMPLOYING A CHROMA-KEY TRACKING TECHNIQUE

FIELD OF THE INVENTION

This invention relates to digital video effects systems, and more particularly to chroma-key tracking systems for electronically compressing and moving a television picture to predetermined dimensions, and position respectively, specified by a chroma-key screen in another picture and for inserting the compressed picture into an area corresponding to the chroma-key screen.

BACKGROUND OF THE INVENTION

The so-called keyed insertion technique, by which a part of one television picture is inserted into another picture to produce a special effect, is frequently used in television broadcasting. One example of such a technique is chroma-key insertion wherein a part of a first picture is designated by a chroma-key signal produced from that picture and the designated part is inserted into a second picture. However, since a chroma-key signal undergoes a change in position and dimension with the movement of a television camera, employed for the pickup of the second picture, the shooting angle of the camera must be modified accordingly. This creates serious difficulties and to eliminate the difficulties, a method has been proposed in which the picture to be inserted is compressed in accordance with the chroma-key signal. (See for example Japanese Patent Publication No. 53-9896.) With this technique, the position and dimensions of the picture are determined by comparing the chroma-key signal with a standard television frame.

Referring to FIGS. 1A–1E, it is assumed that the picture of FIG. 1B is compressed into the size of a chroma-key signal shown in FIG. 1C to produce a picture (FIG. 1D) and that the picture of FIG. 1D is inserted into the picture of FIG. 1A to produce the picture of FIG. 1E. In this example, the chroma-key signal of FIG. 1C serves as the standard signal to designate into to what position and what dimensions the picture of FIG. 1D should be compressed. Generally, the chroma-key signal of FIG. 1C is produced by mixing in appropriate proportions of the blue component, as a main constituent, out of the various chromatic components (the red, green and blue components) constituting the picture of FIG. 1A, with the two other components. It is therefore customary, when a chroma-key signal is to be produced, to compose the picture of FIG. 1A by leaving blue that part of the picture which is cross-hatched.

In the temporal relationship between a chroma-key signal and the compressed picture corresponding to it, the latter tends to include a certain delay when moved as will be explained below. Accordingly, when a chroma-key signal moves, an inconvenience may arise from the inability of the chroma-key signal to move in synchronism with the compressed picture.

FIG. 2A illustrates an output picture in a normal state and FIG. 2B, another output picture immediately after the movement of the chroma-key signal towards the right side of the frame. Since the compressed picture to be inserted into the chroma-key frame moves with a time lag, it is unable to change rapidly enough, resulting in an unnecessary picture position as is represented by hatching in FIG. 2B.

Moreover, since the brighter or white parts of the object in the picture involve much of the blue component the picture may include electrical, noise in addition to the desired key signal as illustrated in FIG. 2C. If the picture is compressed in accordance with such a chroma-key signal, it will be compressed into a picture which includes the noise component wherein the picture is the size represented by the dotted lines in FIG. 2C and appears like the picture in FIG. 2D. The insertion of the picture of FIG. 2D into the picture of FIG. 2C would result in a picture as shown in FIG. 2E, which is undersirable because of the failure of the inserted picture to be fully contained within the designated chroma-key frame. If the noise disappears, the picture will return to the state illustrated in FIG. 1E, but noise components are usually intermittent, resulting in alternating output pictures, which are very unpleasant to look at.

It is, therefore, an object of the present invention to provide a chroma-key tracking system which, when the chroma-key frame shifts in position, prevents unnecessary picture portions from being generated.

It is another object of the present invention to provide a chroma-key tracking system which is capable of correctly extracting the chroma-key frame when the video signal on which the chroma-key signal is based has a component which cannot be readily distinguished from the chroma-key signal.

SUMMARY OF THE INVENTION

In accordance with the invention there is provided a tracking system for producing special effects on a television picture by inserting, into a key frame positioned on a first picture, relating to a first video signal, a second picture relating to a second video signal which is compressed in accordance with the key frame, said system comprising:

means for producing a key signal representing said key frame;

means responsive to said key signal for producing a position signal representing a position of a circumscribed frame of said key frame;

means responsive to said position signal for producing an imaginary-frame position signal representing an imaginary frame greater than said key frame;

means responsive to said second video signal and said imaginary-frame position signal for producing a compressed second video signal representing a compressed second picture, said compressed second picture being identical in size to said imaginary frame; and means for selectively combining said first video signal and said compressed second video signal in response to said key signal, whereby said special effects are obtained in which said compressed second picture is inserted into said chroma-key frame on said first picture.

The features and advantages of this invention will be understood from the detailed description of a preferred embodiment thereof, taken in conjunction with the accompanying drawings, wherein:

DETAILED DESCRIPTION

Figure 3:
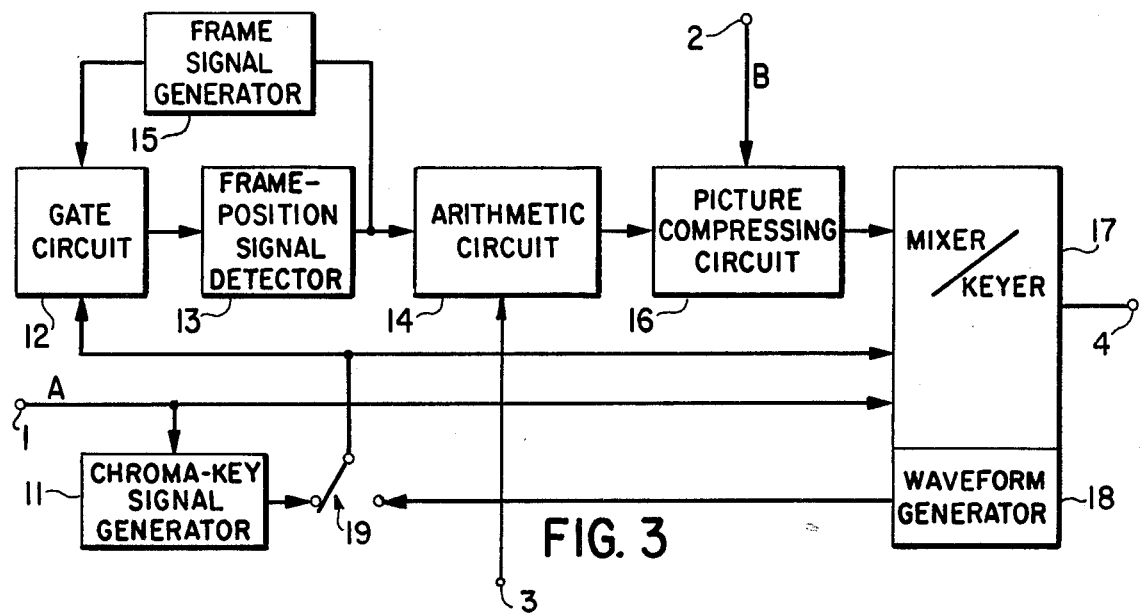
FIG. 3 is a block diagram of an embodiment of this invention.

With reference to FIG. 3, which illustrates one embodiment of this invention, a first video signal A is supplied to a first input terminal 1, a second video signal B to a second input terminal 2 and a control signal to a third input terminal 3. A chroma-key signal generator 11 generates, in response to the first video signal from the first input terminal 1, a chroma-key signal. The chroma-key signal is supplied to a gate circuit 12 via a switch 19, and is gated by the output of a circumscribed frame signal generator 15 to remove its noise component. The output of the gate circuit 12 is supplied to a frame-position signal detecting circuit 13 for detecting four values, i.e., those of the leftmost and righmost points in the horizontal direction and the uppermost and lowermost points in the vertical direction of the chroma-key signal.

Figure 4:
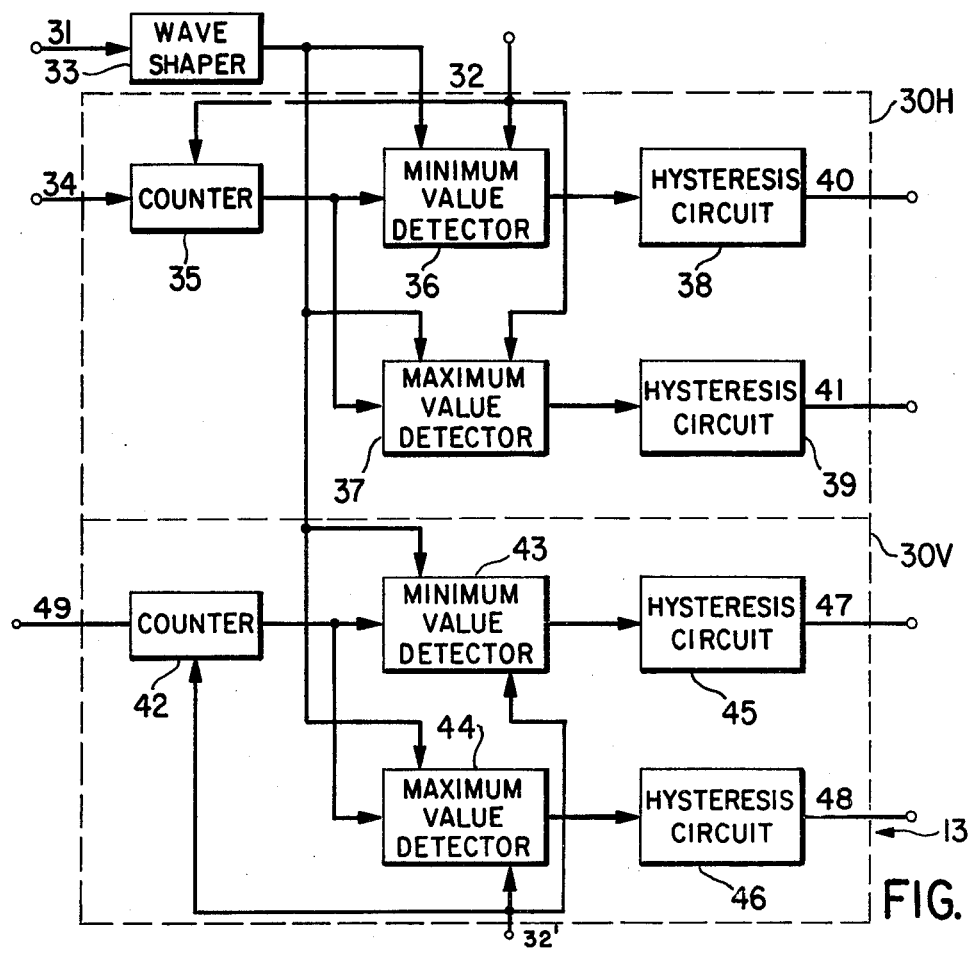
FIG. 4 is a block diagram of the frame-position signal detecting circuit used in the embodiment shown in FIG. 3.

One example of the frame position signal detecting circuit 13 is illustrated in FIG. 4. A chroma-key signal 31 supplied from the chroma-key signal generator 11 through the gate circuit 12 (FIG. 3) is supplied to a wave shaper 33 in which the chroma-key signal is waveshaped to produce a pulsed chroma-key signal. The pulsed key signal is applied to horizontal and vertical position detectors 30H and 30V.

In the horizontal position detector 30H, a counter 35, driven by clock pulses 34 to advance one state per clock pulse, is cleared by pulse 32 each horizontal scanning period of a television signal. The clock pulses 34 have a clock frequency that is higher than the scanning frequency and are produced from the input video signal by, for example, frequency-multiplying the horizontal synchronizing signal contained in the input video signal A. The clear pulse 32 may be produced from the horizontal synchronizing signal. Counter 35 applies the registered counts to a minimum-value detector 36 and to a maximum-value detector 37. The minimum-value detector 36 detects the counter value of the counter 35 as the minimum horizontal value at the leading edge of the pulsed chroma-key signal once every horizontal scanning period. This minimum horizontal value represents the leftmost position of the chroma-key signal in the horizontal direction. The maximum-value detector 37 holds the registered counts of counter 35 at the trailing edge of the pulsed chroma-key signal to detect the last-held value in each horizontal scanning period. The detected value is the maximum horizontal value representing the rightmost position of the chroma-key signal in the horizontal direction. The detectors 36 and 37 are reset by clear pulse 32.

The detected minimum and maximum horizontal values are supplied to hysteresis circuits 38 and 39, respectively, which remove jitter present at the rising and trailing edges of the chroma-key signal. A chroma-key signal, even if the original picture from which it is derived is motionless, usually is susceptible to some jitter at the leading and tailing edges. Accordingly, the outputs of the maximum-value detector 36 and the minimum-value detector 37 are constantly fluctuating by small amounts. The hysteresis circuits 38 and 39, so composed that the outputs will not vary even if the inputs slightly fluctuate, greatly contribute to stabilization of the functioning of the system. The stabilized outputs 40 and 41 are fed to an arithmetic circuit 14.

In the vertical position detector 30V, a counter 42, driven by the horizontal synchronizing pulse 49 to advance one state per horizontal period, is reset to zero by a clear pulse 32' each television field. The clear pulse 32' may be produced from the vertical synchronizing signal contained in the input video signal A. The vertical position detector 30V functions in substantially the same manner as the horizontal position detector 30H except for the period of operation. A minimum-value detector 43 detects a minimum vertical value representing the uppermost position of the chroma-key signal. A maximum-value detector 44 detects a maximum vertical value representing the lowermost position of the chroma-key signal. The detected minimum and maximum vertical values are supplied to hysteresis circuits 47 and 48, respectively to remove jitter. The stabilized outputs 47 and 48 are supplied to the arithmetic circuit 14.

Figure 5:
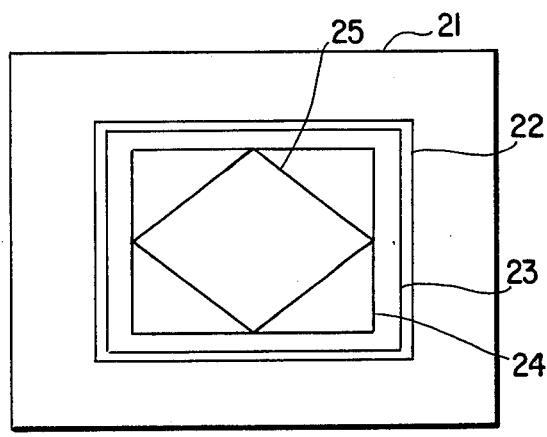
FIG. 5 illustrates the relationships on the full picture among various frames obtained by one embodiment of this invention.

The four values obtained from the circumscribed frame signal detector 13 represent the dimensions and position of the quadrilateral circumscribing the chroma-key signal. Thus in FIG. 5, reference numeral 21 indicates the dimensions of the standard picture, reference numeral 25 shows the chroma-key frame and the four detected values correspond to the points of the four corners of the circumscribed frame 24. These four values are fed to the arithmetic circuit 14 and corrected as to enlarge the dimensions of the frame. In FIG. 5, reference numerals 22 and 23 show two enlarged frames i.e., imaginary frames corresponding to the corrected four values (imaginary frames position signal).

Figure 6:
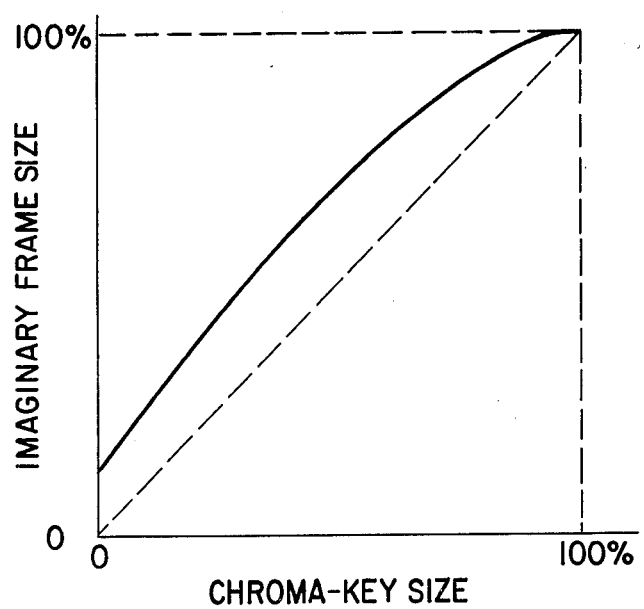
FIG. 6 shows the dimensional relationship between a chroma-key frame and an imaginary-frame.

One example of the dimensional relationship between the circumscribed frame 24 and the imaginary frame 22 or 23 is illustrated in FIG. 6. In FIG. 6, the abscissa represents the size of the circumscribed frame 24 (hereinafter called the chroma-key size) based on the input chroma-key frame 25 and the ordinate, the size of the imaginary frame 22 or 23. The increment in frame size and the chroma-key size are based on the following fact; even if the chroma-key size is minimal, the increment is not zero but has a certain value. While this value is preferably small, to minimize the portion removed by a key signal when a compressed picture is inserted into another by means of a chroma-key signal, it must be greater than a certain level in view of the possibility that the key signal will shift. The value should therefore be made externally controllable. Next, it is provided that the increment should decrease when the chroma-key size is close to the maximum size and that the sum of the chroma-key size and increment should, in no case, exceed the maximum size, because the rate of compression is never greater than one. It is further provided that the increment reach its maximum value when the chroma-key size is at its median, because in the usual state of use the signal most frequently moves to the greatest extent in its median size. Whereas the relationship between the chroma-key size and the increment is determined on the basis of the foregoing, it goes without saying that operation is also possible even if the increment is simply made constant.

Figure 7:
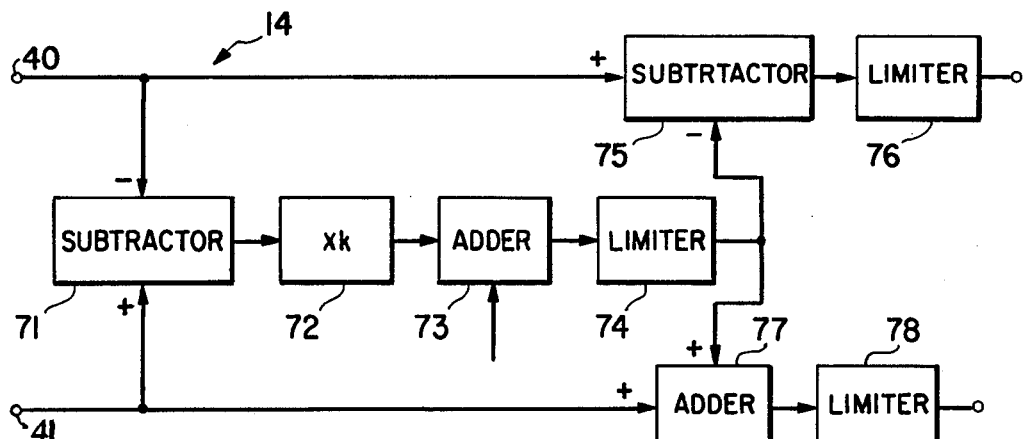
FIG. 7 is a block diagram of the arithmetic circuit employed in the embodiment shown in FIG. 3.

One example of the arithmetic circuit 14 will be described below with reference to FIG. 7. Since the underlying operation is common to both the horizontal and vertical directions, an example of the horizontal direction is given. The minimum value 40 and the maximum value 41 in the horizontal direction, from the position detector 13, are supplied to the arithmetic circuit 14. Subtraction circuit 71 substracts the minimum value from the maximum value. The output of the subtraction circuit 71 thus represents the length L of the circumscribed frame 24 in the horizontal direction. This value then becomes the input to the coefficient unit 72, and is multiplied by a predetermined coefficient to allow the increment of the frame size to include the proportional component of the chroma-key size. Next, a constant is added by adder 73. This addition of the constant a allows the increment of the frame size to include the constant component and make the increment have a certain value even if the chroma-key size is minimal. This output $kL''c$ is applied to a limiter 74 to restrict the output from exceeding a predetermined value. The output of the limiter 74 is applied to a subtractor 75, and subtracted from the minimum value 40. The subtraction remainder is applied to a minimum value limiter 76. The minimum value limiter 76 is composed so as to replace a negative input with zero while not effecting a positive input.

The output of limiter 74 is applied to an adder 77 to be added to the maximum value 41. The sum is applied to a maximum value limiter 78, which is composed so as to replace an input value, exceeding the maximum conceivable value for a key signal, with the maximum value or allow to pass therethrough intact an input value not exceeding the maximum value.

From the foregoing, it is clear that the minimum value 40 is operated on to become smaller and the maximum value 41 is operated on to become greater and, therefore, the chroma-key signal frame size is corrected to become equivalently greater. Explanation of the correction in the vertical direction will be omitted because it is achieved in exactly the same manner as that in the horizontal direction described above except that values proportional to the vertical length (height) of the reference frame 21 are employed as the constant c in the adder 73 and the limit value of the limiter 74.

The four corrected values (the imaginary frame position signal) are fed to the frame signal generator 15 (FIG. 3) to generate a frame signal corresponding to the frame 22 (FIG. 5). This frame signal is supplied to gate circuit 12 to gate the chroma-key signal and to thereby remove the noise component. The noise component outside frame 22 is thus eliminated.

Figure 1A:
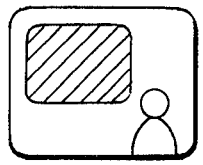
FIGS. 1A to 1E and 2A to 2E illustrate television pictures relating to video signals produced by a conventional prior art system.
Figure 1B:
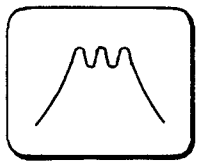
Figure 1C:
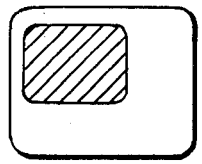
Figure 1D:
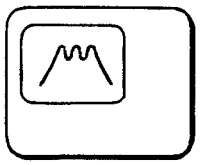
Figure 1E:
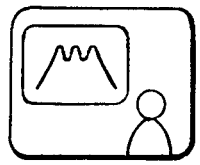
Figure 2A:
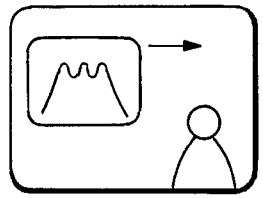
Figure 2B:
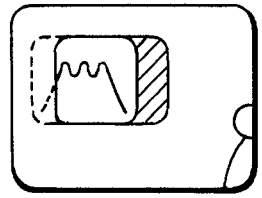
Figure 2C:
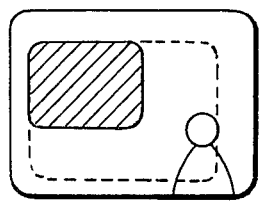
Figure 2D:
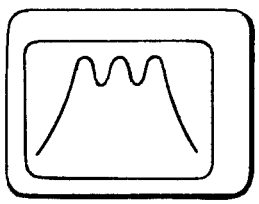
Figure 2E:
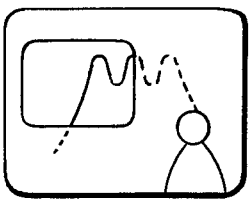

The arithmetic circuit further produces compression data representing the ratio of the imaginary frame size to the reference frame size from the imaginary frame position signal and then 14 supplies the picture compressing circuit 16 with the compression data and the imaginary frame position signal as signals 93 and 94 (FIG. 8), respectively. The output of compressing circuit 16 is supplied to mixer-keyer 17 as one of its inputs. Mixer-keyer 17 is also supplied with the first video signal A and the chroma-key signal, so that the compressed second video signal B can be inserted into and keyed with the first video signal A to give the required output signal 4. The size of the picture compressed by the compressing circuit 16 corresponds to the frame 23, and is greater than the circumscribed frame 25, because the second video signal B is deliberately compressed to a greater degree than the actual key signal to prevent the emergence, as described above, of the unnecessary portion, represented by hatching in FIG. 2B. This unnecessary portion in the output signal results from the gap between the movement of the chroma-key signal and that of the compressed picture owing to a delay in the processing of the signal when the picture is compressed.

Figure 8:
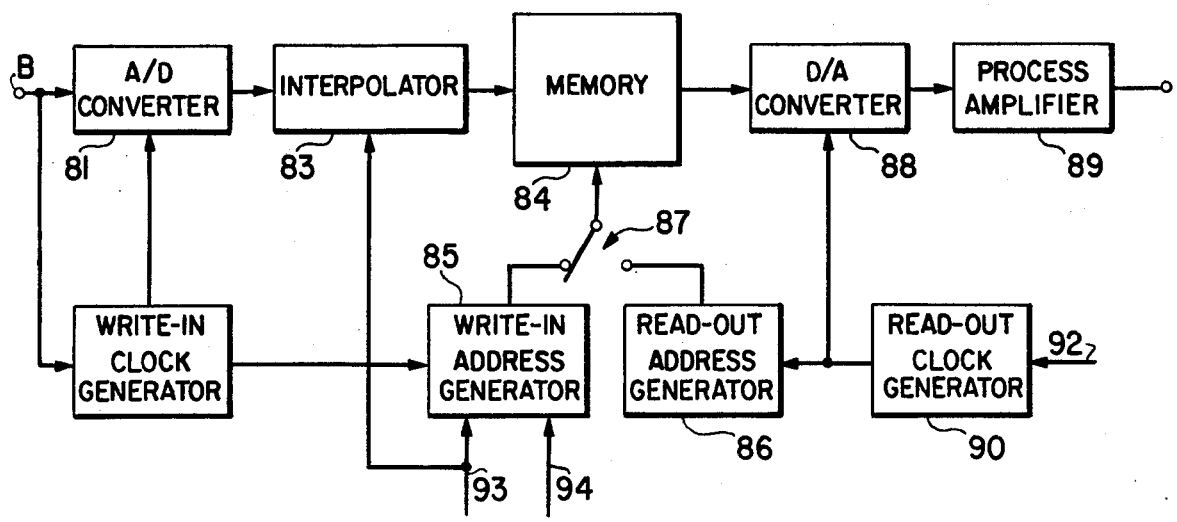
FIG. 8 is a block diagram of the picture compressing circuit employed in the embodiment shown in FIG. 3.

FIG. 8 is a schematic diagram of the picture compressing circuit 16, in which the second video signal B from the input terminal 2 is supplied to the analogue/digital converter 81 and converted into a PCM (pulse code modulation) signal. At the same time, signal B is also supplied to write-in clock generator 82 to generate a continuous wave phase-locked to the color burst signal. This continuous wave is multiplied and sent out as clock pulses for the analogue/digital converter 81. The output PCM signal from the analogue/digital converter 81 is supplied to the interpolating circuit 83.

The interpolating circuit 83 functions to alter the number of picture elements in the horizontal direction and scanning lines in the vertical direction. For instance, when a picture is to be compressed in a ratio of 1/1.5 in the horizontal direction, circuit 83 allows the first of the series of input picture elements to pass therethrough intact, creates by interpolation between the second and third picture elements, a picture element corresponding to exactly the middle of the two and delivers it as the second of the output picture elements, and allows the fourth picture element to pass therethrough intact to constitute the third output picture element. By repeating this procedure the number of output picture elements can be reduced to 1/1.5 of the number of input picture elements. This is equivalent to a 1.5-fold expansion of the sample gap in the analogue/digital converter. The output of interpolating circuit 83 is written into memory 84.

Accordingly, the compressed picture is already written into the memory 84. These controls are effected by the signals of the outputs 93 and 94 from the arithmetic circuit 14. More particularly signal 93 controls the gap between the picture elements, newly created in the interpolating circuit 83, and the signal 94 controls the write-in address generator 85 which generates the address when a signal is written into the memory 84. Insertion into memory 94 is accomplished in such a manner that the address value be increased by one every time a picture element arrives.

The readout address generator 86 generates the read-out address to be used when a signal is read out of the memory 84. Switch 87 is intended for selection of the write-in address when the signal is to be written-in or selection of the read-out address when it is to be read out. The read-out clock generator 90, using the reference sync signal 92 as input, generates the read-out clock to drive the read-out address generator 86 and the digital/analogue converter 88. The digital/analogue converter 88 converts the read out PCM signal from the memory 84 into an analogue signal. This analogue signal is fed to the process amplifier 89, amplified therein and turned out as the signal 91. This output signal, in the form of a picture signal compressed into a prescribed position and size, is supplied to the mixer-keyer 17 as one of its inputs.

As explained above, this system, with which it is possible to automatically compress an input picture into the size of a chroma-key signal supplied from outside, is very effective in the production of television programs. Although the chroma-key signal has been referred to in the above description as an example of the key signal, the principle of the present invention is of course directly applicable to the wipe key or the like from the wave generator 18. An advantageous feature of this system is its stable operation even when the key signal contains a noise component.

Although a specific embodiment of this invention has been shown and described, it will be undertsood that various modifications may be made without departing from the spirit of this invention.

What is claimed is:

1. A tracking system for producing special effects on a television picture, picture comprised of a first picture and a second picture inserted into said first picture, said first and second pictures being represented by first and second video signals respectively, said system comprising: means for producing a key signal representing a key frame to be positioned on said first picture; means responsive to said key signal for producing a position signal representing a position of a circumscribed frame of said key frame; means responsive to said position signal for producing an imaginary-frame position signal representing an imaginary frame greater than said key frame; means responsive to said second video signal and said imaginary-frame position signal for producing a compressed second video signal representing a compressed second picture, said compressed second picture being identical in size to said imaginary frame; and means responsive to said key signal for selectively combining said first video signal and said compressed second video signal, whereby to said special effects are produced.

2. A tracking system in accordance with claim 1 wherein said position signal producing means includes means for removing electrical noise signals from said key signal.

3. A tracking system in accordance with claim 2 wherein said frame position signal includes two horizontal position signal values and two vertical position signal values, the tracking system further including means for detecting minimum and maximum horizontal position signal values and minimum and maximum vertical position signal values.

4. A tracking system in accordance with claim 3 wherein there is further included means for subtracting said minimum horizontal position signal value from said maximum horizontal position value and said minimum vertical position signal value from said maximum vertical position signal value, said horizontal difference being representative of said circumscribed frame length and said vertical difference being representative of said circumscribed frame height.

5. A tracking system in accordance with claim 4 further including means responsive to said horizontal and vertical differences for generating said imaginary frame position signal.

* * * * *